United States Patent

Uno et al.

[11] 3,887,932
[45] June 3, 1975

[54] MEMORY SWITCH CONTROLS FOR CAMERAS

[75] Inventors: Naoyuki Uno; Katsuhiko Nomura, both of Kawagoe, Japan

[73] Assignee: Asahi Kogaku Kogyo Kabushiki Kaisha, Japan

[22] Filed: Sept. 19, 1973

[21] Appl. No.: 398,806

[30] Foreign Application Priority Data
Sept. 21, 1972 Japan.............................. 47-108966

[52] U.S. Cl. .................. 354/156; 354/51; 354/258
[51] Int. Cl. ........................................... G03b 19/12
[58] Field of Search ......... 354/152, 156, 50, 51, 60, 354/258

[56] References Cited
UNITED STATES PATENTS
3,623,410   11/1971   Mita................................. 354/60 X
3,641,890   2/1972   Ono.................................. 354/51 X
3,695,159   10/1972   Mita..................................... 354/50

Primary Examiner—Richard A. Wintercorn
Attorney, Agent, or Firm—Steinberg & Blake

[57] ABSTRACT

A structure for controlling the memory switch of a single lens reflex camera in which a mirror directs light from the objective to a light-measuring structure. Just prior to exposure the mirror is swung up to permit light to reach the film, and when the mirror is swung up light can no longer reach the light-measuring structure. A structure which blocks the drive of the mirror to its upper position cooperates with the memory switch to place the latter in an operative position when the blocking structure moves to a release position releasing the mirror drive for operation, so that in this way the memory switch is rendered operative prior to swinging of the mirror to its upper position.

10 Claims, 2 Drawing Figures

MEMORY SWITCH CONTROLS FOR CAMERAS

BACKGROUND OF THE INVENTION

The present invention relates to cameras.

In particular, the present invention relates to single lens reflex cameras of the type where light is internally measured after being reflected by the mirror which is behind the objective.

With cameras of this type it is well known that a series of operations are required in response to depression of the shutter-tripping plunger by the operator. These operations include just before actual tripping of the shutter, swinging up of the mirror, stopping down of the diaphragm, and prior to these latter operations measurement of the light which has travelled through the objective and is reflected by the mirror to a light-measuring structure situated at the region of the viewfinder of the camera. Thus, a memory structure such as a capacitor must be charged by the light-measuring structure so as to retain the information corresponding to the intensity of the light at the object to be photographed, inasmuch as when the mirror is swung up in order to permit an exposure to be made the light can no longer be measured. It is therefore essential for a memory structure of this type to carry out its information-retaining function prior to swinging up of the mirror but in response to the initiation of the movement of the shutter-tripping plunger.

In order to assure a sequence of operations according to which the information with respect to the light intensity will be retained by the memory structure prior to swinging up of the mirror, the structure which operates in response to the initiation of the depression of the shutter-tripping plunger includes a train of elements which are conventionally designed to have a certain amount of lost motion enabling the memory structure to operate. For example, during this initial lost-motion phase of the operation a switch connected in parallel across a memory capacitor is opened to render the memory capacitor operative to be charged in accordance with the intensity of the light, and only after the lost motion phase of the operation is completed does the structure operate to drive the mirror up and stop the diaphragm down just prior to actual opening of the shutter.

This lost-motion type of transmission represents a serious disadvantage of conventional cameras. In the first place, a transmission of this type is difficult to regulate so that the series of operations will take place in the required sequence. In the second place, structures such as springs must be excessively tensioned in order to provide the force required not only to carry out the lost-motion during which the light is measured and a corresponding electrical quantity is stored, but also to carry out the actual driving of the mirror and stopping down of the diaphragm, and then the tripping of the shutter. Thus, a relatively large spring force must be stored to carry out all of these operations and a relatively large extent of movement of the components is required with difficulty being encountered in regulation of the timing of the sequence of operations. All of these problems result in an undesirable reduction of output in the manufacture of the cameras with the required precise timing, and of course the costs involved in such manufacture is undesirably high.

SUMMARY OF THE INVENTION

It is accordingly a primary object of the present invention to provide a camera structure which will avoid the above drawbacks.

In particular, it is an object of the present invention to provide a structure which does not require a lost-motion movement of components before the mirror-driving and diaphragm-stopping down operations take place, in order to carry out the light measurement and storing functions.

Thus, it is a specific object of the present invention to provide a structure which does not require excessive forces to be stored in springs in order to carry out relatively large amounts of movement of the components.

In addition it is an object of the present invention to provide a structure where the timing of the sequence of operations can be easily and accurately carried out at a relatively low cost and with a far greater output than has heretofore been possible.

In particular it is an object of the present invention to provide a structure of this type which is capable of assuring operation of the memory structure prior to swinging up of the mirror and stopping down of the diaphragm, while eliminating the difficulties encountered in conventional cameras.

Also it is an object of the present invention to provide a structure which will operate very reliably to achieve the desired sequence of operations in a highly effective manner without any possibility of erroneous switch-operation due to chattering or vibration of elements and with an ease in the adjustment of the timing sequence of the operations.

In particular it is an object of the present invention to provide a construction of the above type which makes additional use of components which are available in any event for purposes other than activation of the memory structure.

The structure of the invention forms part of a single lens reflex camera which has a mirror situated behind the objective and normally occupying a lower viewing position where the image is reflected by the mirror to the viewfinder, this mirror also acting when in its lower viewing position to reflect light to a light-measuring structure situated at the region of the viewfinder. A memory switch means is movable between a normal inactive position and an operative position where memory structure of the camera is rendered operative to store the information with respect to the light which travels through the objective from the object to be photographed. A mirror-drive means is provided for driving the mirror from its lower viewing position to an upper exposure position, and a switch-operating means is provided for displacing the memory switch means from its inactive position to its operative position. In accordance with the invention this switch-operating means has, when the memory switch means is in its inactive position, a rest position where the switch-operating means blocks the mirror-drive means against operation. When a manually operable means is set into motion by the operator for carrying out a series of operations resulting in tripping of the shutter, this manually operable means cooperates with the switch-operating means to move the latter so as to place the memory switch means in its operating position, and it is only when the switch-operating means is moved in this way that the mirror-drive means is capable of operating to drive the mirror to its upper exposure position.

BRIEF DESCRIPTION OF DRAWINGS

The invention is illustrated by way of example in the accompanying drawings which form part of this application and in which.

DESCRIPTION OF A PREFERRED EMBODIMENT

Figure 1:
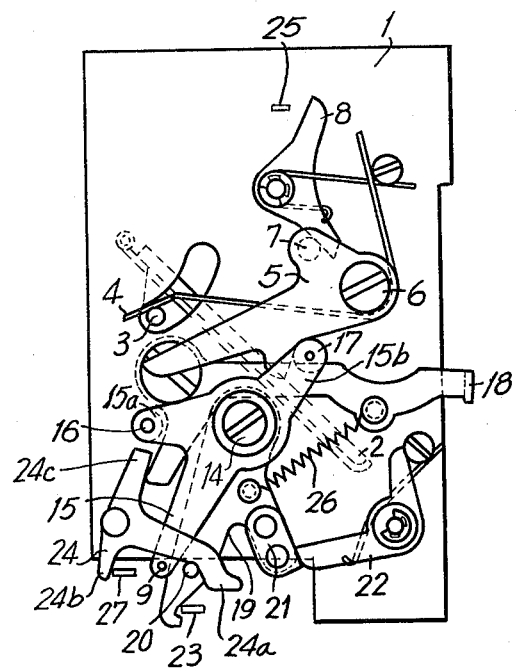
FIG. 1 shows in elevation a side surface of a mirror box and structure located at this side of the mirror box for carrying out a sequence of operations resulting in finally tripping of the shutter.

Referring now to the drawings and to FIG. 1 in particular, there is illustrated therein an outer side surface of a mirror box 1 which in a well known manner houses in its interior the tiltable mirror 2 which normally occupies the lower position illustrated in FIG. 1. This mirror 2 is supported for swinging movement about a horizontally extending shaft situated at the upper end of the mirror 2 and extending perpendicularly with respect to the wall of the box 1 which is visible in FIG. 1. As is well known to those skilled in the art, the objective is situated to the right of the box 1, as viewed in FIG. 1, so that the light after travelling through the objective will be reflected upwardly by the mirror 2. Thus, the box 1 is formed at its right end, as viewed in FIG. 1 with an opening through which the light can travel from the objective to reach the mirror 2. From the mirror 2 the light is reflected upwardly in a well known manner to a viewfinder structure which is conventional and therefore not illustrated, and at the viewfinder structure there is also situated in a well known manner a photosensitive structure for receiving the light which has travelled through the objective in order to measure the intensity thereof so as to contribute to the automatic determination of the length of exposure of the film. Just prior to exposure of the film the mirror 2 is swung up in a counterclockwise direction, as viewed in FIG. 1, to a substantially horizontal exposure position permitting the light which travels through the objective to continue to travel along the optical axis beneath the mirror 2 and up to the film plane where the film is situated to be exposed when the shutter is opened in a well known manner.

The frame which carries the mirror 2 also fixedly carries a pin 3 which extends through a curved slot formed in the wall of the box 1 which is visible in FIG. 1. A spring 4 presses downwardly on the pin 3, this spring 4 extending around a pin 6 and engaging a stationary stop member as illustrated. Thus the spring 4 serves to yieldably retain the mirror 2 in its lower viewing position which is illustrated in FIG. 1.

The illustrated structure includes a mirror-drive means for driving the mirror up to its horizontal exposure position, and this mirror-drive means is formed in part by a turnable lever 5 which is turnable on the pin 6 and which has an upper edge the left region of which, as viewed in FIG. 1, engages the pin 3 to swing the mirror 2 up to its exposure position when the lever 5 turns in a clockwise direction about the pin 6, as viewed in FIG. 1. The lever 5 in addition to forming part of the mirror-drive means, forms part of a motion transmission which trips the shutter. For this purpose the level 5 carries a pin 7 engaging one edge of a lever 8 urged by the spring illustrated in FIG. 1 in a clockwise direction into engagement with the pin 7. Situated in the path of movement of the upper end of the lever 8 is a shutter-tripping member 25 which is displaced slightly to the left, as viewed in FIG. 1, in order to trip the shutter. Thus when the mirror-drive lever 5 is swung in a clockwise direction, as viewed in FIG. 1, the pin 7 will turn the lever 8 in a counterclockwise direction in order to cause the lever 8 to engage the shutter-tripping member 25.

The mirror-drive means further includes a turnable lever 15 supported for turning movement on a pin carried by the wall of the box 1 which is visible in FIG. 1, the lever 15 having a turning axis which is parallel to the turning axis of the lever 5. Thus, FIG. 1 illustrates the lever 15 supported for swinging movement by the pin 14. The lever 15 of the mirror-drive means includes a substantially horizontally and rearwardly extending arm 15a which carries at the region of its free end a roller 16. This roller 16 extends across an edge of a diaphragm-controlling lever means 18. This lever means 18 is of a substantially L-shaped configuration and has a downwardly extending arm across which the roller 16 extends in the manner illustrated. The horizontally extending arm of the lever 18 terminates at its right free end in a projection which cooperates with the diaphragm in a well known manner which does not form part of the present invention and therefore is not illustrated. The lever 18 is supported for turning movement by a pin which is parallel to pins 6 and 14 and which is situated between the lever 5 and the surface of the box 1 which is visible in FIG. 1. The lever 18 also extends between a roller 17 and the surface of the box 1 which is visible in FIG. 1. This roller 17 is carried by an arm 15b of the lever 15, and the roller 17 extends beneath the lever 5 so as to swing the latter in a clockwise direction when the lever 15 is driven in a counterclockwise direction about the pin 14, as viewed in FIG. 1.

A manually operable release means is provided for releasing the mirror-drive means 5, 15 so that this structure will not only swing the mirror up to its exposure position, but also will swing the diaphragm-controlling lever 18 in a counterclockwise direction for automatically stopping the diaphragm down to its preselected aperture in a well known manner. This manually operable release means includes a lever 19 which is swingably mounted on the pin 14 behind the lever 15 so that the release lever 19 and the mirror-drive lever 15 have a common turning axis. It is to be noted that the lever 19 is situated between the lever 15 and the surface of the box 1 which is visible in FIG. 1 while the lever 18 extends in part between the lever 19 and the surface of the box 1 which is visible in FIG. 1. The lever 19 of the manually operable release means is connected by a spring means 26 to the diaphragm-control lever 18. Thus the manually operable release means includes the release lever means 19 and the spring means 26 which is tensioned between the levers 18 and 19 in the manner illustrated. As a result when the lever 19 is in the position shown in FIG. 1 the lever 18 is pulled by the spring 26 to the illustrated position where the diaphragm is fully open, as is well known. Cooperation between the release lever means 19 and the mirror-drive lever 15 is achieved by way of a pin 20 which is fixed to the lever 19 and situated in the path of swinging movement of the lever 15. Thus the lower downwardly extending arm of the lever 15 which is illustrated in FIG. 1 will normally swing into engagement with the pin 20, so that only release of the lever 19 for counterclockwise turning about the pin 14 will permit the lever 15 to swing in the same direction about the pin 14 in order to drive the mirror up by way of the lever 5. The pin 20 also serves to control a switch-operating means which includes the substantially T-shaped lever 24 which is illustrated in FIG. 1. This lever 24 of the switch-operating means is supported for turning movement on the wall of the box 1 which is visible in FIG. 1, this lever 24 being supported by a pin carried by the box 1 and extending parallel to the pins 6 and 14 so that the lever 24 turns about an axis parallel to the turning axes of the levers 5 and 15. The pivot pin which supports the lever 24 is situated adjacent the left edge thereof, as viewed in FIG. 1, between the upwardly extending arm of the lever 24 which is directed toward the roller 16 and the downwardly extending arm 24b, this lever 24 having also a substantially horizontally extending arm 24a which is curved at its right free end region in the manner illustrated in FIG. 1. The pin 20 extends across the lower edge of the arm 24a in order to cooperate with the curved free end portion thereof in a manner described in greater detail below.

Figure 2:
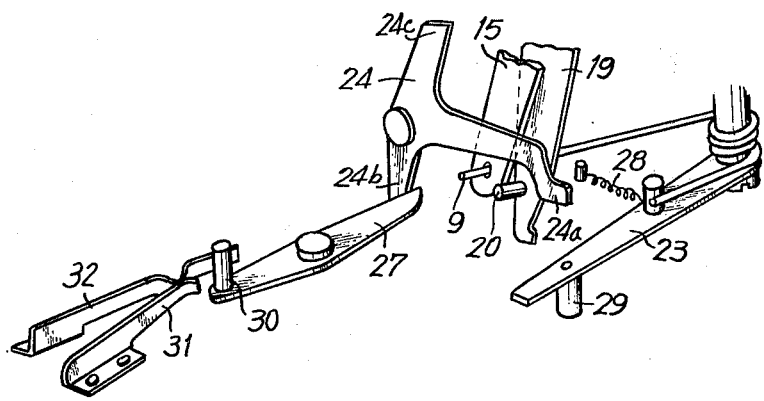
FIG. 2 is a perspective fragmentary view of structure located at the lower part of FIG. 1 as well as structure associated with the memory switch.

The switch-operating means includes in addition to the lever 24 a lever 27 which is supported for turning movement about a vertical axis extending between the ends of the lever 27 which is shown in FIG. 2. Thus, the lower arm 24b of the lever 24 engages a free end portion of the lever 27 so that when the lever 24 turns in a counterclockwise direction, as viewed in FIG. 1, the lever 27 will be turns in a clockwise direction when looking downwardly on the lever 27 in FIG. 2. This lever 27 of the switch-operating means carries at its end region which is distant from the arm 24b a pin 30 made of an electrically non-conductive material, and a switch blade 32 is situated in the path of movement of this insulating pin 30. This switch blade 32 is a springy element which normally engages a stationary switch blade 31. Thus elements 31 and 32, due to the inherent force of springy component 32, form a normally closed switch. When the lever 27 is swung in response to counterclockwise turning of the lever 24, as described above, the pin 30 displaces the switch element 32, in opposition to the inherent force of the normally closed switch, away from the switch element 31 so as to open the switch 31, 32, and it will be noted that it is the springy force of the switch blade 32 which acts through the pin 30 and the lever 27 on the lever 24 so as to urge the latter in a clockwise direction, as viewed in FIG. 1, to the position illustrated in FIG. 1.

The switch 31, 32 forms a memory switch means. In a manner which is well known in the art, this switch is connected in parallel across a capacitor, for example, of an electrical circuit which will determine automatically the duration of exposure of film when the shutter opens. The photosensitive means which receives light reflected from the mirror 2 when the latter is in its viewing position shown in FIG. 1 is electrically connected with the above capacitor which serves to store in the form of an electrical charge the information corresponding to the intensity of the light which travels through the objective of the camera. Just prior to swinging up of the mirror, the memory switch means 31, 32 is automatically opened so that in this way the capacitor will operate to store the charge corresponding to the light intensity.

As is shown most clearly in FIG. 2, a lever 23 is situated beneath the mirror box 1 and supported for turning movement about a vertical axis, this lever 23 being turned through an unillustrated transmission in response to cocking of the shutter and transportation of the film when the operator swings a lever provided for this purpose. Thus the transmission connected to the lever turned by the operator for cocking the shutter and advancing the film is operatively connected with the pin 29 shown in FIG. 2 in order to swing the lever 23 in a counterclockwise direction, as viewed when looking down on the lever 23, so that the lever 23 will at this time be displaced toward the right from the position thereof indicated in FIG. 1. A drive spring 9 is coiled around the shaft which carries the lever 23, this spring 9 having a free end engaging a pin which is fixed to and extends upwardly from the lever 23 as well as an opposite free end which extends through an opening in the lever 15 of the mirror-drive means.

The release lever means 19 of the manually operable release means has a downwardly extending forward arm which carries a stop plate 21 provided with an edge which engages an end of a lever 22 which forms part of the manually operable release means. This lever 22 is supported for turning movement about a pin carried by the box 1, as illustrated in FIG. 1, and a spring acts on the lever 22 so as to place the latter normally in the holding position shown in FIG. 1. Thus when the shutter is cocked and the film is advanced, the lever 23 will be turned so as to store in the spring 9 a driving force which is prevented from being released because the lever 15 will engage the pin 20 while the plate 21 will engage the lever 22. However, when the shutter-tripping plunger is depressed by the operator, through an unillustrated transmission, during the initial part of the downward movement of this plunger the lever 22 will be swung in a counterclockwise direction, as viewed in FIG. 1, releasing the plate 21 so that the lever 15 can now be driven by the spring 9. The lever 23 is retained in an unillustrated and well known manner in the position storing in the spring 9 the force for driving the lever 15. However, after the shutter has been tripped a restoring spring 28 acts to return the lever 23 to the position indicated in FIG. 1, so that the lever 23 swings the lever 19 and through the pin 20 the lever 15 back to their starting positions. As soon as the lever 19 has been returned in this way to its initial position the lever 22 is returned by the spring shown at the lower right of FIG. 1 back to its holding position in front of the holding plate 21 so that when the shutter is again cocked while the film is again advanced the parts will again remain in the position of FIG. 1 until the lever 22 is again moved in response to the initial part of the movement of the shutter-tripping plunger by the operator.

According to a particular feature of the present invention the upper arm 24c of the lever 24 is situated in the path of turning movement of the roller 16. In other words the switch-operating means 24, 27, when in its rest position shown in the drawings, prevents operation of the mirror-drive means 15, 5. It is only after the lever 24 has been swung in a counterclockwise direction from its rest position shown in FIG. 1, in order to open the memory switch means 31, 32, that the drive lever 15 is free to move past the arm 24c of the lever 24. With the structure of the invention, when the lever 22 is turned in a counterclockwise direction away from the holding plate 21, the spring 9 is not immediately free to drive the mirror upwardly through the lever 15 and the lever 5. As was indicated above the spring 26 is tensioned between the levers 18 and 19. This tensioning of the spring 26 is brought about by the force of the restoring spring 28 which, after release of the shutter, returns the lever 23 to its initial position. This return of the lever 23 to its initial position swings the lever 19 back to its initial position while acting through the lever 19 and the spring 26 on the lever 28 to return the diaphragm to its wide open position as is well known. This movement restores a force of tension in the spring 26 which is sufficient to turn the lever 19 in advance of the lever 15 in a counterclockwise direction around the pin 14 as soon as the holding lever 22 moves downwardly beyond the holding plate 21. This movement of the lever 19 by the spring 26 which in any event is present for controlling the diaphragm through the lever 18 causes the pin 20 to act on the curved right free end portion of the arm 24a so as to turn the lever 24 in opposition to the force of the spring blade 32, thus causing the switch-operating means 24, 27 to open the memory switch means 31, 32 while displacing the arm 24c of the lever 24 away from its position blocking operation of the mirror-drive means 15, 5. Thus it is only after the memory switch means has been displaced from its normal inactive position to its operative position that the switch-operating means 24, 27, frees the mirror-drive means 15, 5 for movement by the spring 9 in order to drive the mirror 2 upwardly from its lower viewing position to its upper exposure position. Of course, in addition to driving the mirror upwardly the roller 16 causes the mirror-drive means to drive the lever 18 in order to stop the diaphragm down to its preselected aperture in a well known manner, and after the mirror has been swung up to its exposure position the lever 8 will reach the element 25 so as trip the shutter and make the exposure.

Thus, the initial driving force for the release lever means 19 is obtained from the spring 26 which is present in any event for holding the diaphram in its wide open position. As a result an additional spring is not required for this purpose. Furthermore, no additional tensioning of the spring 26 is required.

Of course, as is well known, as soon as the exposure has been completed the parts will automatically return to the position shown in FIG. 1.

It is apparent from the above description that the release lever means 19 is initially operated with the energy stored in the spring means 26 so that a separate spring means to store energy required for operation of the release means is not required and thus the number of parts required for the structure of the invention is reduced. In addition, the increment of time required for a complete operating cycle to take place, particularly the increment of time from opening of the switch 31, 32 until the start of the swinging up of the mirror 2 may be made sufficiently long to assure a reliability and stability in the operation of the memory switch means 31, 32 so that the electrical circuitry will operate properly without any erroneous operation resulting for example, from chattering or other sources of vibration. In addition, it is noted that with the structure of the invention a considerable convenience is achieved inasmuch as the desired controls are provided without increasing the forces which must be stored in springs in response to operation of the lever which transports the film and cocks the shutter, inasmuch as a separate spring to initiate the operation is not required and inasmuch as an undesired lost-motion movement prior to swinging up of the mirror also is not required.

What is claimed is:

1. In a single lens reflex camera which measures light internally and which has a swingable mirror normally occupying a lower viewing position where said mirror reflects light which has travelled through the objective to a light-measuring structure and being swingable from said lower position to an upper exposure position where light travelling through the objective no longer reaches the light-measuring structure, memory switch means movable between a normal inactive position and an operative position enabling a memory structure to retain information received by the light-measuring structure, said memory switch means having an inherent force which acts to maintain said memory switch means in said inactive position, mirror-drive means cooperating with the mirror to drive the latter upwardly from said lower viewing position to said upper exposure position, switch-operating means cooperating with said memory switch means for displacing the latter in opposition to said inherent force from said normal inactive position to said operative position, said switch-operating means having a rest position cooperating with said mirror-drive means to prevent operation thereof, said switch-operating means being movable from said rest position thereof for placing said memory switch means in said operative position thereof, while said switch-operating means also releases said mirror-drive means for operation to drive said mirror to said exposure position thereof, and manually operable release means to be set into motion by the operator of the camera for carrying out operations in connection with shutter release, said manually operable release means cooperating with said switch-operating means for moving the latter to place said memory switch means in said operative position thereof, whereby said mirror-drive means will not be released to drive the mirror upwardly to its exposure position until after said memory switch means has been placed by said switchoperating means in said operative position thereof.

2. The combination of claim 1 and wherein said manually operable release means includes a lever means acting on said switch-operating means for controlling the position of the latter and a spring means acting on said lever means for urging the latter to move said switchoperating means for placing said memory switch means in said operative position thereof, said manually operable means also including a manually operable release member retaining said lever means in opposition to said spring means in an initial position where said switch-operating means is in said rest position thereof, said release member being movable by the operator for releasing said lever means to the force of said spring means so that said lever means will then move said switch-operating means to place said memory switch means in said operative position thereof while releasing said mirror-drive means for operation.

3. The combination of claim 2 and wherein a diaphragm control means is operatively connected with said spring means to be urged thereby to a given position, so that said spring means acts both on said diaphragm-control means and said lever means.

4. The combination of claim 3 and wherein said mirror-drive means also cooperates with said diaphragm-control means for displacing the latter from said given position to which it is urged by said spring means when said mirror-drive means is released for operation upon movement of said switch-operating means to place said memory switch means in said operative position thereof.

5. The combination of claim 4 and wherein a shutter-tripping means is operatively connected with said mirror-drive means to be driven thereby to trip a shutter of the camera, so that the release of the mirror-drive means to displace the diaphragm-control means from said given position thereof and to drive the mirror upwardly to its exposure position and drive the shutter-tripping means does not take place until said switch-operating means operates to place said memory switch means in said operative position thereof.

6. The combination of claim 1 and wherein said memory switch means includes a springy component acting to maintain said memory switch means in its normal inactive position and said switch-operating means in its rest position.

7. The combination of claim 2 and wherein said switch-operating means includes a swingable lever, said lever means carrying a pin engaging said swingable lever for turning the latter when said lever means is released to said spring means by movement of said release member for actuating the switch-operating means to place said memory switch means in its operative position.

8. The combination of claim 1 and wherein said switch-operating means when in said rest position thereof has a portion situated in the path of movement of part of said mirror-drive means to prevent operation thereof, said memory switch means acting with said inherent force thereof on said switch-operating means for maintaining the latter in said rest position thereof.

9. The combination of claim 8 and wherein said mirror-drive means and switch-operating means both include a pair of levers which have parallel turning axes, said lever of said mirror-drive means having an arm and said lever of said switch-operating means having an arm situated in the path of movement of said arm of said lever of said mirror-drive means when said switch-operating means is in said rest position thereof, said manually operable release means including a lever having a pin engaging said lever of said switch-operating means to turn the arm of the latter away from the path of movement of said arm of said lever of said mirror-drive means when said switch-operating means is actuated by said manually operable release means to place said memory switch means in said operative position thereof.

10. The combination of claim 9 and wherein a diaphragm-control lever means also has a turning axis parallel to the turning axes of said levers of said mirror-drive means and said switch-operating means, said manually operable release means including a spring tensioned between said diaphragm-control lever means and said lever of said manually operable release means and said arm of said mirror-drive means driving said diaphragm-control lever means when released by displacement of said arm of said switch-operating means.

* * * * *